United States Patent [19]

Fockens

[11] 3,902,018

[45] Aug. 26, 1975

[54] MULTIPLE CHANNEL FM STEREO SYSTEM EMPLOYING AM VESTIGIAL SIDEBAND SUBCARRIER MODULATION

[75] Inventor: Pieter Fockens, Glenview, Ill.

[73] Assignee: Zenith Radio Corporation, Chicago, Ill.

[22] Filed: Dec. 3, 1973

[21] Appl. No.: 421,011

[52] U.S. Cl. .......................... 179/15 BT; 179/1 GQ

[51] Int. Cl. .......................... H04h 5/00

[58] Field of Search .. 179/15 BT, 1 GQ, 1 G, 1 GP, 179/100.1 ST

[56] References Cited

UNITED STATES PATENTS

| | | | |
|---|---|---|---|
| 3,079,464 | 2/1963 | Baumel | 179/15 FD |
| 3,679,832 | 7/1972 | Halpern | 179/15 BT |
| 3,708,623 | 1/1973 | Dorren | 179/15 BT |
| 3,754,099 | 8/1973 | Takaoka | 179/15 BT |
| 3,787,629 | 1/1974 | Limberg | 179/15 BT |
| 3,789,323 | 1/1974 | Anderson | 179/15 BT |
| 3,814,858 | 6/1974 | Parker | 179/15 BT |

OTHER PUBLICATIONS

Quadrature Ambience With Reference Tone, by Gerzon, Radio Electronics, Dec., 1970, (P. 52, 53 and 58).

Multiplex Methods for FM Broadcast Transmission of Four-channel Stereo signals, by Halstead & Feldman, Journal A.E.S., Dec., 1970.

*Primary Examiner*—Kathleen H. Claffy
*Assistant Examiner*—Tommy P. Chin
*Attorney, Agent, or Firm*—Cornelius J. O'Connor

[57] ABSTRACT

A quadraphonic FM system includes an encoder and a decoder for processing four-channel stereo information is disclosed. The information is represented by four audio signals LF, RF, LB and RB that correspond to sources located at the left-front, right-front, left-back and right-back, respectively, of a listening point. Sub-carrier signals of frequencies $\omega_s$ and $\omega_{sv}$ are employed, which subcarriers have frequencies substantially higher than the highest audio signal component to be translated. In a disclosed embodiment all of the different signals are combined to develop a composite quadraphonic baseband signal comprising a carrier that is frequency modulated by a main channel, by a double-sideband suppressed-carrier amplitude modulated two-channel stereo subcarrier, by a double-sideband suppressed-carrier amplitude modulated subcarrier in quadrature with the two-channel stereo subcarrier and by a lower vestigial sideband suppressed-carrier amplitude modulated subcarrier higher in frequency than the two-channel subcarrier, which composite baseband signal can be expressed by the function f(t):

$$f(t) = k_1[M + Y \sin\omega_s t - X \cos\omega_s t - m\,U \sin\omega_{sv} t + m\,\hat{U}G(\omega)\cos\omega_{sv} t] + S \sin\omega_s t/2 - T \sin\omega_{sv} t + V \cos\Omega t.$$

6 Claims, 5 Drawing Figures

PATENTED AUG 26 1975 3,902,018

COMPOSITE BASEBAND SPECTRUM

VESTIGIAL SIDEBAND FILTER
AMPLITUDE RESPONSE

MULTIPLE CHANNEL FM STEREO SYSTEM EMPLOYING AM VESTIGIAL SIDEBAND SUBCARRIER MODULATION

CROSS-REFERENCE TO RELATED APPLICATION

This application discloses subject matter which is related to subject matter disclosed in copending application Ser. No. 401,926, filed Sept. 28, 1973, in the name of Carl G. Eilers, which application is assigned to the assignee of this application.

SPECIFICATION

1. Background of the Invention

The present invention relates to multiple-channel frequency-modulation stereo systems. More particularly, it pertains to methods and apparatus for encoding and decoding multiple channel stereo signals.

Present-day broadcast FM stereo features the transmission of a two-channel coherent stereo signal the modulation function of which may be represented:

$$M'(t) = K'(L+R) + K''(L-R)\sin\omega_s t, \tag{1}$$

where L represents a left-side audio signal, R represents a right-side audio signal, $\omega_s$ is the frequency of a suppressedcarrier amplitude-modulated subcarrier signal, $t$ is time, and K' and K'' are constants. A two-channel stereo receiver responds to a stereo broadcast by demodulating the sum and difference audio terms and then matrixing those two terms in order to yield the fundamental left and right audio signals L and R. The same receiver will respond to a monaural FM broadcast by reproducing the same monaural audio signal in both of its output channels. On the other hand, a monaural FM receiver will respond to the two channel broadcast stereo signal by deriving only the sum term (L+R) as represented in equation (1) and reproducing an audio signal that represents the monaural program. The two-channel signal thus is fully compatible with the monaural signal so that a receiver properly designed for one also will receive the other. Further detailed discussion of the foregoing two-channel transmission system and exemplary disclosures of transmitters and receivers for use therewith will be found in U.S. letters Pat. Nos. 3,257,511-Adler et al; 3,257,512-Eilers; 3,129,288-DeVries and 3,151,218-Dias et al, all assigned to the same assignee as the present application.

In the last few years, interest has been evident in tape-recording systems wherein a four-channel stereo signal is recorded on magnetic tape. Four different audio signals are individually recorded on four respective different tracks along the tape. The four different audio signals represent sources respectively located at the left-front, right-front, left-rear and right-rear of an originating point. By using four different pick-up and amplification systems together with four separate loudspeakers similarly distributed around a listening point, four-channel reproduction is obtained.

The advent of four-channel stereo recording and reproduction has naturally led to consideration of the desirability of transmitting and receiving four-channel stereo signals by radio. Because two-channel stereo is now being broadcast by many FM transmitting stations, attention has been directed particularly to the possibility of utilizing broadcast stations in that category of service for the transmission of four-channel stereo in addition to, or instead of, the transmission of two-channel stereo or monaural signals. To accomplish this requires the development of a different overall transmission signal in order to accommodate the additional information components necessary to convey four separate channels. At the same time, it is desirable that any four-channel approach be fully compatible both with two-channel stereo and monaural, so that receiver obsolescence is avoided.

It is also desirable, from the standpoint of broadcast station economics, that a commercial four-channel stereo system provide for an SCA (Subsidiary Communications Authorization) channel.

OBJECTS OF THE INVENTION

Accordingly, it is a general object of the present invention to provide a new and improved four-channel stereo FM broadcast system which is compatible with conventional two-channel and monaural broadcasting.

Another object of the present invention is to provide a four-channel stereo broadcast system in which the arrangement of the channels is consistent with that of present-day four-channel stereo recordings.

A further object of the present invention is to provide a compatible four-channel stereo broadcasting system in which bandwidth requirements are consistent with existing broadcast standards.

It is a specific object of the invention to provide an improved four-channel FM stereo broadcast system which accommodates an SCA channel.

It is also an object of the invention to provide a four-channel decoding system having a minimal number of frequency selective networks.

Specific objects of the present invention include the provision of transmitters and receivers operable in broadcast systems meeting the preceding objectives.

SUMMARY OF THE INVENTION

A quadraphonic receiver for developing four discrete audio signals from a transmitted composite baseband signal that frequency modulates an RF carrier is described. The composite baseband signal includes, in the frequency domain, at least the following components; a four-element sum component representing the sum of four input audio signals individually representative of first, second, third and fourth audio sources located, respectively, at the left-front, right-front, left-back and right-back of a listening point, a first difference component representing the difference between related pairs of the input audio signals double sideband suppressed carrier amplitude modulating a first subcarrier of angular frequency $\omega_s$, a second difference component representing a difference between differently related pairs of the input audio signals double sideband suppressed carrier amplitude modulating a second subcarrier of angular frequency $\omega_s$ but displaced in phase, relative to the phase of the first subcarrier, by 90°, a diagonal difference component representing a difference between diagonally related pairs of the input audio signals lower single sideband suppressed carrier amplitude modulating a third subcarrier of angular frequency $\omega_{sv}$, and a pilot signal having an angular frequency $\omega_s/2$ and a phase which is such that the phase of its second harmonic bears a predetermined relationship to the first subcarrier. The quadraphonic receiver comprises discriminator means for extracting the composite baseband signal from the RF carrier and decoding means comprising first, second and third demodulators. The extracted composite baseband signal is applied to first input terminals of each of the demodulators. Subcarrier regeneration means, responsive to the extracted composite baseband signal, develop first, second and third local subcarriers corresponding in frequency and phase to those of the first, second and third modulated subcarriers, respectively. Means are provided for applying the first, second and third local subcarriers to second input terminals of respective ones of the first, second and third demodulators for effectively removing from the modulated first, second and third subcarriers, said first difference component, said second difference component and said diagonal difference component, respectively. Finally, the receiver includes a matrix network which is responsive to the extracted composite baseband signal and to the first and second difference components and the diagonal difference component for deriving four discrete output audio signals which are related to said four input audio signals.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
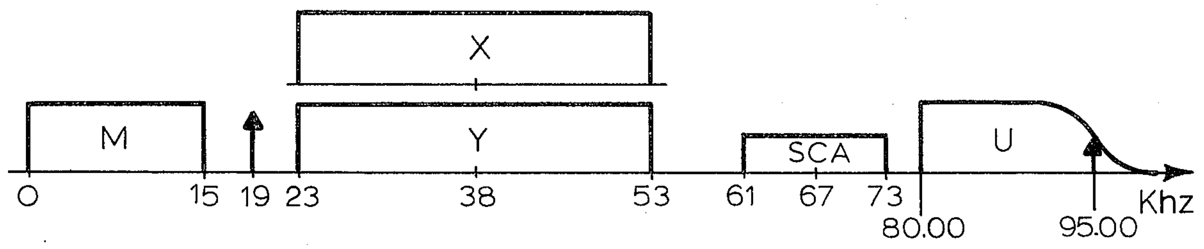
FIG. 1 is a representation of the composite baseband spectrum for a four-channel FM stereo system having specific provision for an SCA channel.

In order to provide background for an understanding of quadraphonic FM, as well as to supplement the present disclosure without burdening it with a repetition of the extensive teaching in the above-mentioned Eilers copending application, the content of Eilers' application, as represented by the specification and drawings, is hereby expressly incorporated in this application.

The four-channel stereo system described by Eilers in connection with his FIGS. 1–14 contemplates the generation and detection of a composite quadraphonic baseband signal comprising a carrier that is frequency modulated by a main channel, by a pair of double sideband suppressed carrier amplitude modulated subcarriers of a radian frequency $\omega_s$ and in quadrature, and by a double sideband suppressed carrier amplitude modulated subcarrier of radian frequency $\omega_{sv}$ which preferably equals $2\omega_s$. In such a four-channel stereo system, in principle, no frequency selective networks are required for the actual decoding process. Either time division multiplexing (TDM) or frequency division multiplexing (FDM) can be employed for generating the composite baseband signal. The type of receiver employed for detecting and reproducing the four-channel composite signal can, of course, utilize either TDM or FDM circuitry but, in either case, it is possible to decode the aforementioned composite baseband signal without the use of frequency selective networks, disregarding such networks as might have to be used in the subcarrier regeneration process. Thus, a decoder for such a system, whether of the FDM or the TDM type or even a combination thereof, can be of relatively unsophisticated construction and, by resort to monolithic integrated circuits, a potentially low priced decoder is readily foreseen.

Another approach to four-channel stereo transmission and reception is described in connection with FIGS. 15–22 in the Eilers copending application. In that system the lower sideband of the second subcarrier $\omega_{sv}$ is suppressed so that only the upper sideband, in substance, is transmitted. The purpose in employing upper single sideband transmission is to accommodate the SCA signal which is conventionally located in that portion of the spectrum which would be occupied by the lower sideband of the second subcarrier $\omega_{sv}$. The SCA signal is a double sideband FM subchannel having its subcarrier normally located at 67kHz and having sidebands bracketing the subcarrier and extending from 61 to 73kHz.

A decoder for a composite baseband signal including a double sideband suppressed carrier amplitude modulated second harmonic subcarrier, for example, is represented by the arrangements shown in FIGS. 7, 8, 11, 12 and 14 of the aforementioned Eilers copending application. If any of these Eilers decoders are used to decode a composite baseband signal, which includes a single sideband suppressed carrier amplitude modulated second harmonic subcarrier, assuming that both composite baseband signals have equal upper subchannel amplitudes, a properly decoded signal would be obtained in the absence of a transmitted SCA signal at 67kHz. However, as soon as an SCA signal is transmitted, the decoders in Eilers' FIGS. 7, 8, 11, 12 and 14 will decode the SCA signal as if it were a lower sideband of the second harmonic subcarrier and thus introduce serious interference.

To avoid this interference Eilers teaches, in his copending application (text material relating to FIGS. 15–22), either a phasing method or a band stop filter method for decoding. However, both methods require frequency selective circuits for the actual decoding process.

One approach, now to be considered, that precludes the demodulating decoder from intermixing the SCA and the upper subchannel contemplates reversing the spectrum of the upper sideband of the upper subchannel of the Eilers' composite baseband signal. For example, by resorting to a 91.0kHz (approximately) subcarrier to generate the upper subchannel and by modulating it lower single sideband suppressed carrier, the same spectrum is occupied as would be occupied by modulating upper single sideband on a 76kHz subchannel, but the location of the audio frequencies is now reversed. In demodulating the lower sideband of a 91kHz subchannel by an appropriate subcarrier, the SCA band, when demodulated, falls above the audio band and thus is inaudible. Furthermore, as will be shown, the SCA information will be attenuated by the de-emphasis networks employed in the practice of the subject invention.

From a practical point of view, namely, deriving the subcarrier in the decoder from the 19kHz pilot, it is desirable, but not necessary, to establish an integral harmonic relationship between the upper subcarrier and the pilot. Fractional harmonic relationships are also useful, some possibilities being 85.5kHz (4.5 harmonic), 87.4kHz (4.6 harmonic), 90.25kHz (4.75 harmonic), and 91.2kHz (4.8 harmonic). However, a 95.0kHz subcarrier is preferred, which frequency, being the fifth harmonic of the 19kHz pilot, is a simple harmonic relationship to achieve and, for that reason, is particularly attractive. Insofar as the other four mentioned frequencies are concerned, it should be realized that an ambiguity in phase will be encountered in the process of regenerating any of those frequencies from a 19kHz pilot. This ambiguity can be avoided by transmitting a second pilot subcarrier of the exact frequency and phase required for demodulating the particular subcarrier. This is a less desirable approach, however, since a pilot transmitted at a frequency high in the baseband spectrum, and at limited deviation, is subject to considerable noise interference. Similarly, the higher baseband frequencies are more apt to be subjected to phase distortion in the IF and FM detector portions of the receiver, which phase distortion adds to the phase uncertainty of the receiver's, second pilot.

In regenerating an upper subcarrier, a second pilot is not required when the frequency of that subcarrier is harmonically related to the first pilot since the requisite signal can be locally derived from the first pilot without phase uncertainty and with good noise immunity. However, a second pilot may be employed for the purpose of indicating to the receiver that a quadraphonic program is being transmitted and for automatically activating the quadraphonic decoder circuit. Then, in the absence of such a second pilot, the decoder is deactivated and does not contribute noise to a monophonic or biphonic program.

Now, and in accordance with the subject invention, a quadraphonic FM system is disclosed in which an upper subcarrier frequency is selected such that, when modulated, its lower sideband does not extend into the spectrum space required for SCA service. To this end, an upper subchannel carrier in the order of 95kHz is proposed since it conveniently comprises the fifth harmonic of the 19kHz pilot signal which signal must be available in order that the quadraphonic system be compatible with the conventional biphonic system. This 95kHz subcarrier is modulated utilizing a lower single sideband technique or, preferably, a lower vestigial sideband approach.

If lower single sideband modulation is chosen, the composite baseband signal spectrum would extend to 95kHz. On the other hand, if lower vestigial sideband is selected there is some upper sideband spectrum present and thus the baseband is extended beyond 95kHz. Nevertheless the latter approach is chosen since the peak value of such a composite baseband signal is less than that encountered when using lower single sideband modulation, thus permitting greater deviation of the main channel. In this fashion, and as will be shown, the modulation components do not extend into the SCA spectrum. Furthermore, a subchannel thus modulated can be decoded by straight forward frequency division multiplex techniques and without resort to frequency selective networks.

In any event, irrespective of whether lower single sideband or lower vestigial sideband is selected, SCA information cannot interfere with the audio signals borne by the third (95kHz) subchannel so long as the third subcarrier is frequency spaced from the SCA subcarrier by an amount that is at least equal to the spectrum occupied by one-half the bandwidth of the SCA channel plus the bandwidth allocated to the third subchannel audio, i.e., 15kHz, see FIG. 1.

Insofar as the choice between vestigial sideband and lower single sideband modulation is concerned, it is to be further noted that vestigial sideband modulation can be achieved with filter or phasing methods while single sideband modulation is achieved, from a practical standpoint, only by resort to phasing networks.

Now, the modulation function for the four-channel stereo composite baseband signal, derived in accordance with the teaching of the invention, can be expressed as follows:

$$f(t) = k[M + Y \sin \omega_s t - X \cos \omega_s t - m\, U \sin \omega_{sv} t + m\, \hat{U} G(\omega) \cos \omega_{sv} t] + S \sin \tfrac{1}{2}\omega_s t - T \sin \omega_{sv} t + V \cos \Omega t \quad (1)$$

M = (LF + RF + LB + RB) Four-element sum component

Y = (LF − RF + LB − RB) First difference component

Figures 3, 5:
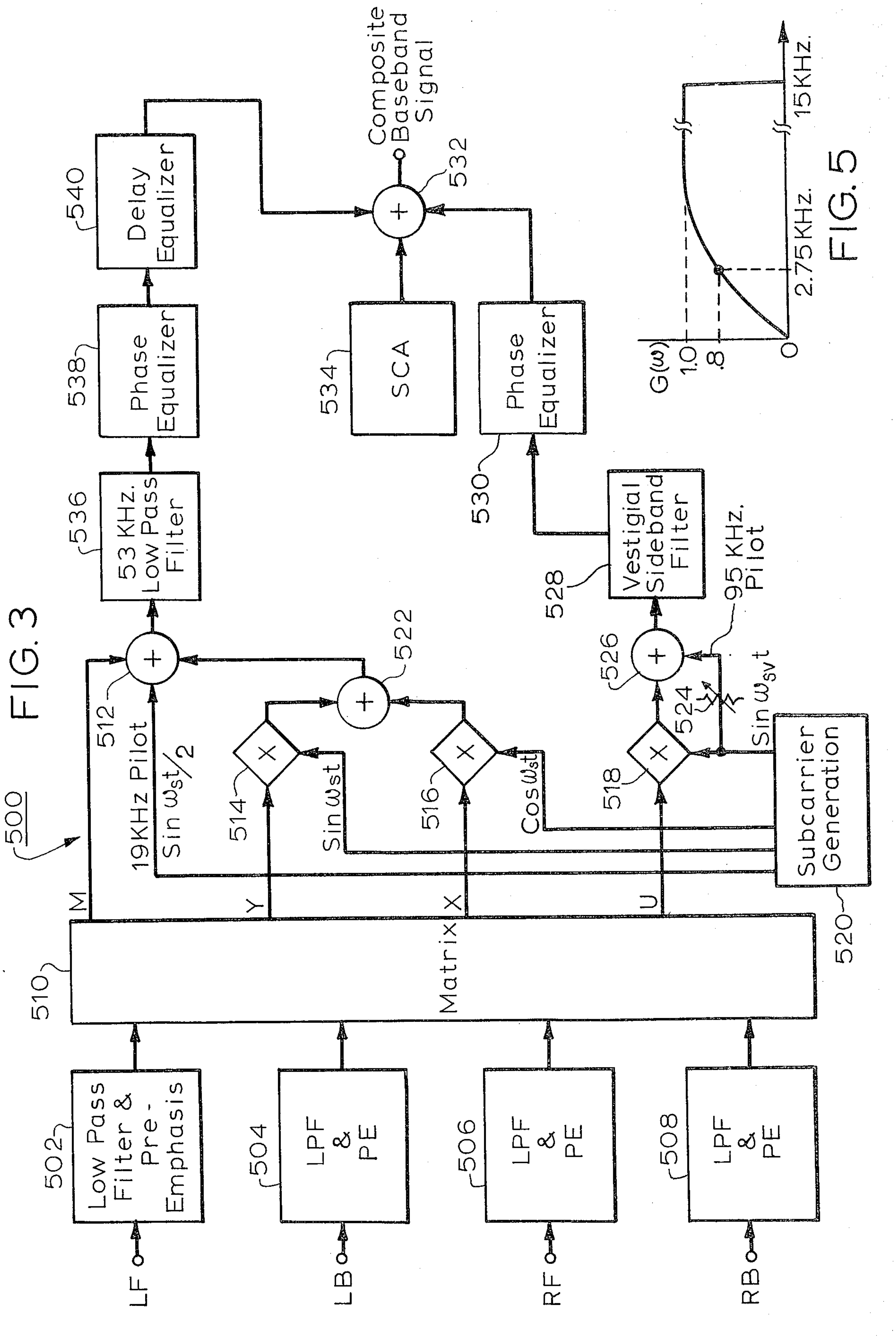
FIG. 3 is a block diagram of an encoder for use in a four-channel stereo transmitter capable of encoding the four-channel stereo signal represented in FIG. 1.
FIG. 5 is a graphical representation of G($\omega$), a high pass filter transfer auxiliary function.

X = (LF + RF − LB − RB) Second difference component $\hat{U}$ = ($\hat{LF}$ − $\hat{RF}$ − $\hat{LB}$ + $\hat{RB}$) Diagonal difference component U = (LF − RF − LB + RB), the Hilbert Transform of U G ($\omega$) = Auxiliary Transfer Function, which is graphically depicted by FIG. 5

LF = left-front signal

RF = right-front signal

LB = left-back signal

RB = right-back signal

S = 0.1, the first pilot subcarrier amplitude

T = 0.05, the second pilot subcarrier amplitude

V = 0.1, the SCA subcarrier amplitude at a nominal frequency of 67kHz $\omega_s = 2\pi \times 38{,}000$ radians per second $\omega_{sv} = 2\pi \times 95{,}000$ radians per second $\Omega = 2\pi \times 67{,}000$ radians per second $k$ = modulation constant $m = 0.7$ As is apparent from the composite baseband signal expression above, the upper subchannel is transmitted with an amplitude limited to 70 percent of the other subchannels, that is, when all subchannels are modulated by identical signals. The reason for such limiting is to reduce the amplitude of that region of the transmitted spectrum falling near the adjacent channel since signals in that region are received by the adjacent channel as interference. In so doing the overall signal-to-noise ratio of the transmitted signal is reduced but such a compromise is in the best interests of all concerned.

The upper subchannel portion of the composite baseband signal is a lower vestigial sideband signal. It will now be demonstrated that the lower vestigial sideband signal characteristic, as defined by the last two terms enclosed within the brackets in expression (1), has a Nyquist slope. This means that the sum of the upper and lower sideband components of a particular modulating signal is a constant.

These terms can be expressed by the functions $f_3(t)$:

$f_3(t) = -m\, U \sin\omega_{sv}t + m\, \hat{U}G(\omega) \cos\omega_{sv}t$

Noting that $G(\omega)$, as defined above, is an Auxiliary Transfer Function, as graphically illustrated by FIG. 5, Let $U = \sin\omega t$ Then $\hat{U} = -\cos\omega t$, yielding $$f_3(t) = -m \sin\omega t \sin\omega_{sv}t - mG(\omega) \cos\omega t \cos\omega_{sv}t$$

$$f_3(t) = -\frac{m}{2}[\cos(\omega_{sv}-\omega)\, t - \cos(\omega_{sv}+\omega)t]\ \frac{m}{2}G(\omega)[\cos(\omega_{sv}-\omega)t + \cos(\omega_{sv}+\omega)t]$$

$$f_3(t) = -\frac{m}{2}[1+G(\omega)]\cos(\omega_{sv}-\omega)t + \frac{m}{2}[1-G(\omega)] \cos(\omega_{sv}+\omega)t$$

The first term represents the lower sideband, the second the upper sideband,

Amplitude lower sideband = $\frac{m}{2}[1+G(\omega)]$

Amplitude upper sideband = $\frac{m}{2}[1+G(\omega)]$

Sum of amplitudes = m, which is independent of $\omega$.

This, by definition, is a Nyquist characteristic.

A quadraphonic FM stereo system which is fully compatible with monophonic and biphonic FM transmissions, as well as with the SCA service, will now be described. This system contemplates a particular treatment of the upper subchannel. More particularly, in the system to be described, the upper subchannel comprises a subcarrier, the frequency of which is preferably a harmonic of the 19kHz pilot. This subcarrier is lower sideband, preferably vestigial lower sideband, suppressed carrier AM modulated by a signal comprising a diagonal difference between selected input signals, specifically signal U. An arrangement found to be particularly appropriate for use in a system of the type herein described contemplates a 95kHz subcarrier which, of course, is the fifth harmonic of the 19kHz pilot. This subcarrier is phased, relative to the pilot, such that each time the 95kHz subcarrier crosses the time axis, the 19kHz pilot subcarrier crosses the time axis simultaneously and in the same direction.

The composite baseband spectrum for the subject system is shown in FIG. 1. As therein illustrated, the upper subchannel at 95kHz utilizes vestigial sideband, suppressed carrier amplitude modulation so that only the lower sideband and a vestige of the upper sideband are transmitted. Those frequencies extending from 50Hz to approximately 2.75kHz are transmitted in both sidebands of the 95kHz subcarrier. However, those frequencies extending from approximately 2.75kHz to 15kHz are transmitted only as lower single sideband signals.

Figure 2:
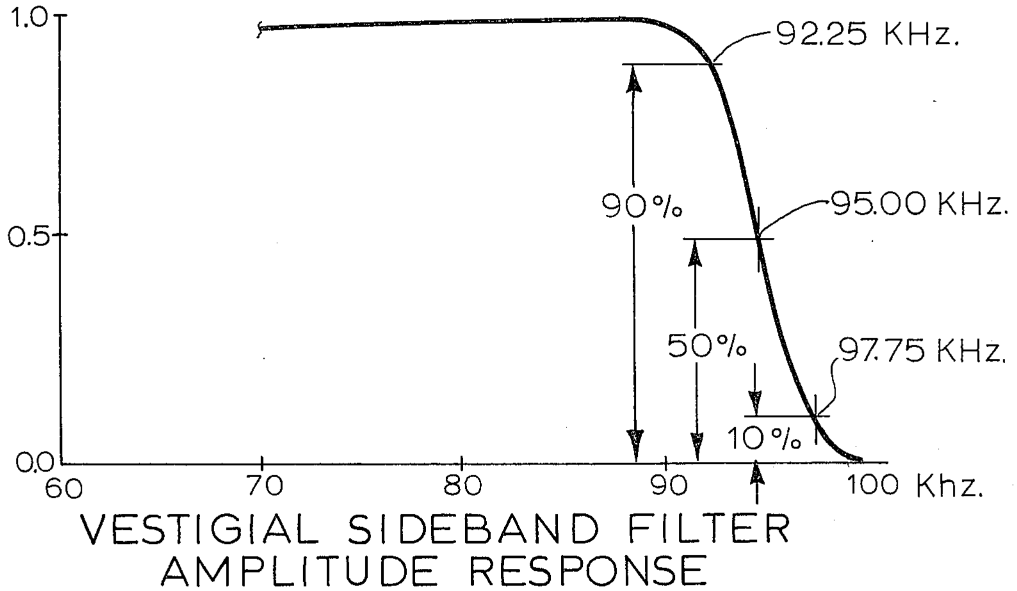
FIG. 2 is a graphical illustration of the amplitude response of a vestigial sideband filter.

FIG. 2 depicts the amplitude characteristic of a vestigial sideband filter. As noted in FIG. 1, the lower sideband of the upper subchannel is seen to occupy a baseband spectrum from 80 to approximately 97.75kHz. Since the lower sideband extends only to 80kHz, sufficient spectrum is reserved in the baseband to adequately accommodate transmission of the SCA channel at its commonly assigned carrier frequency of 67kHz and its sidebands extending from 61kHz to 73kHz.

A pilot subcarrier having a nominal amplitude of 5 percent is also broadcast at 95kHz which can be used in recovering the vestigial sideband information as well as to provide automatic switching of the quadraphonic decoder to accommodate monophonic, biphonic or quadraphonic transmissions.

The quadraphonic baseband signal to be radiated by the FM transmitter is represented by the expression (I) given above. This baseband signal is generated by an encoder 500 which is represented in block diagram form in FIG. 3. In this encoder four discrete audio input signals, LF, LB, RF and RB are band limited by the 15kHz sharp cutoff low pass filters 502, 504, 506 and 508, respectively. These filters are associated with pre-emphasis networks that subject the audio input signals to a standard pre-emphasis, i.e., 75 microseconds. Thereafter, the band limited pre-emphasized audio signals are applied to a matrix 510 which develops the main channel and subchannel modulating signals M, Y, X and U. The M signal is coupled directly to an input terminal of an adder 512 while the Y, X and U signals are coupled to input terminals of respective modulators 514, 516 and 518. A subcarrier generator 520 is provided for the purpose of developing a 19kHz pilot signal which is coupled to another input terminal of adder 512. Generator 520 also develops, from the 19kHz pilot, first and second subcarriers in the form of a pair of 38kHz quadrature subcarrier signals, designated $\sin\omega_s t$ and $\cos\omega_s t$, which are coupled to input terminals of modulators 514 and 516, respectively. Modulators 514 and 516, by virtue of the subcarriers and modulating signals coupled thereto, serve to produce two distinct double sideband suppressed carrier amplitude modulated signals. As shown the output signals of modulators 514 and 516 are combined in an adder 522, the output of which is applied to adder 512.

Generator 520 also develops from the 19kHz pilot a third subcarrier in the form of a 95kHz signal, designated $\sin\omega_{sv}t$, which is applied to an input terminal of modulator 518 so that a double sideband suppressed carrier amplitude modulated signal is derived at its output terminal. The subcarrier $\omega_{sv}t$ is further coupled, via a phase adjustor 524 to the input of an adder 526 which adder combines the output signal of modulator 518 with the phase adjusted 95kHz pilot $\omega_{sv}t$.

The output of adder 526 is applied to the input of a vestigial sideband filter 528, the frequency response of which is illustrated in FIG. 2, in order to provide the necessary attenuation of the upper sideband of the 95kHz subchannel. The shaped output of filter 528 is then coupled to a phase equalizer 530 prior to application to the adder 532. The output signal of an SCA subchannel generator 534 is also coupled to adder 528.

The output of adder 512 is coupled to a 53kHz low pass filter 536, in order to eliminate any signals above 53kHz, and thence to a phase equalizer 538. Finally, the phase equalized output of stage 538 is then delay equalized by the equalizer stage 540 to provide a total delay equal to the delay encountered by the vestigial sideband signal and its pilot prior to their insertion in adder 532. The phase and delay equalized output from stage 540 is then applied to the composite adder 532, the output of which constitutes the composite baseband signal which can be represented by the expression (I). This baseband signal is then employed to frequency modulate the transmitter carrier.

Figure 4:
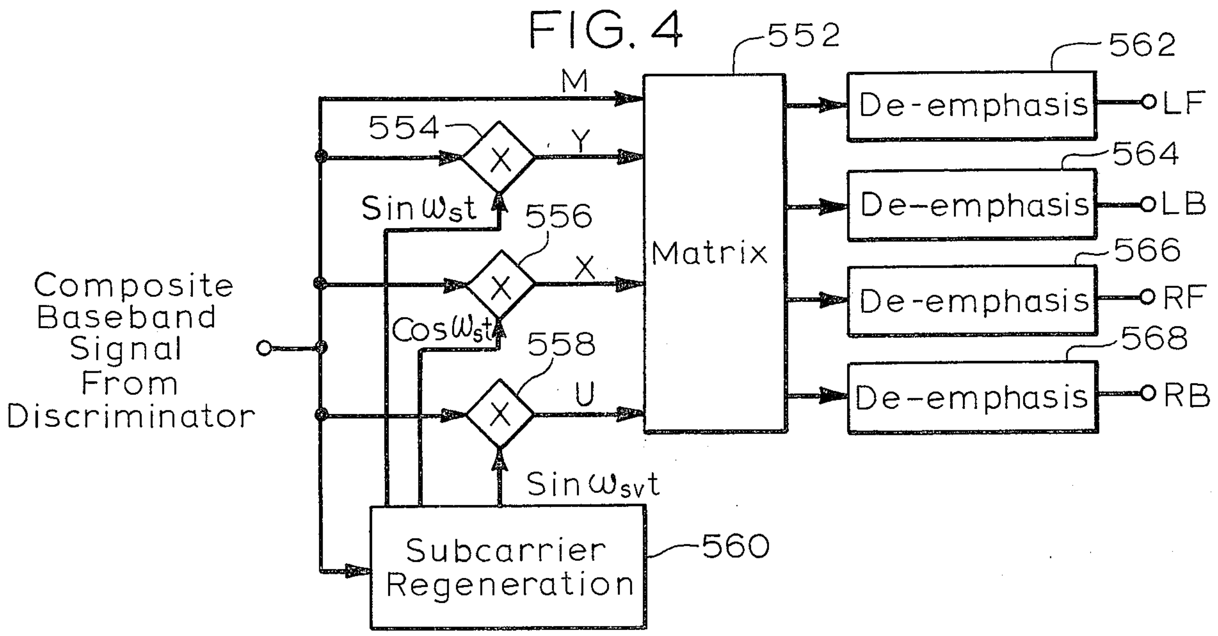
FIG. 4 is a block diagram of a decoder capable of retrieving four discrete audio signals from a detected four-channel composite baseband signal.

Upon reception, the four discrete audio signals are retrieved from the quadraphonic baseband signal by a decoder 550, shown in block diagram form in FIG. 4, comprising a series of demodulators and a matrix network. The composite baseband signal, which is initially extracted from the RF carrier by an FM discriminator, can be expressed, mathematically, by expression (I). This detected signal is applied, simultaneously, to a matrix 552, to respective input terminals of three product demodulators 554, 556 and 558 and to a subcarrier regenerator 560. The regenerator, in response to the 19kHz pilot signal borne by the composite baseband signal, derives $\sin\omega_s t$, $\cos\omega_s t$ and $\sin\omega_{sv} t$ local subcarriers corresponding in frequency and phase to those of the received first, second and third modulated subcarriers. The aforementioned three local subcarriers are applied to demodulators 554, 556 and 558, respectively, which demodulators effectively remove the first difference component Y, the second difference component X and the diagonal difference component U, from the subcarriers for application to matrix 552. To this end modulators 554 and 556 comprise means for demodulating double sideband suppressed carrier amplitude modulated subcarriers while unit 558 comprises means for demodulating a vestigial sideband suppressed carrier amplitude modulated subcarrier.

The matrix network, in response to the extracted composite baseband signal and to M, Y, X and U components derive four discrete output audio signals which are related to the four input audio signals applied to the matrix network 510 of transmitter encoder 500, FIG. 3.

The signal processing is completed by de-emphasis networks 562, 564, 566 and 568 which operate upon the four output signals from matrix 552 to yield four discrete signals corresponding to the LF, LB, RF and RB audio signals originally applied to transmitter encoder 500.

A particular type of quadraphonic FM system has been described, which system is capable of processing four discrete audio signals in a manner compatible with existing monophonic and biphonic services. Moreover, a particular advantage of this system resides in the ease with which it accommodates an SCA subchannel at its presently assigned 67kHz center frequency and in the simplicity of a decoder.

To recapitulate, there follows an elaborate description of the preferred form of the composite four-channel stereo signal employed in the practice of the invention:

1. The main channel component consists of the sum ¼(LF+LB+RF+RB) of the left-front, left-back, right-front, and right-back four channel input signals, respectively. The main channel component frequency modulates the main carrier to a maximum of 86.8 percent (excluding the SCA subchannel signal).

2. The pilot subcarrier at 19kHz frequency modulates the main carrier 10 percent.

3. The first 38kHz subcarrier, $\sin\omega_s t$, is the second harmonic of the 19kHz pilot subcarrier and crosses the time axis with a positive slope (increasing main carrier frequency) simultaneously with each crossing of the time axis by the 19kHz pilot subcarrier. The first 38kHz subcarrier and its sidebands signal is the first 38kHz subcarrier double sideband, suppressed carrier, amplitude modulated by a four channel input signal, ¼[(LF+LB)−(RF+RB)], which corresponds to a two channel ½(L−R) left minus right input signal. The first 38kHz subcarrier and its sidebands signal frequency modulates the main carrier to a maximum of 86.8 percent (excluding the SCA subchannel signal).

4. The second 38kHz subcarrier, $\cos\omega_s t$, is the second harmonic of the 19kHz pilot subcarrier and is in quadrature with the first 38kHz subcarrier. The second 38kHz subcarrier causes an upward peak deviation of the main carrier frequency each time the 19kHz pilot subcarrier crosses the time axis. The second 38kHz subcarrier and its sidebands signal is, the second 38kHz subcarrier double sideband, suppressed carrier, amplitude modulated by a four channel front minus back input signal, ¼[(LF+RF)−(LB+RB)]. The second 38kHz subcarrier and its sidebands signals frequency modulates the main carrier to a maximum of 86.8 percent (excluding the SCA subchannel signal).

5. The 95kHz subcarrier, $\sin\omega_{sv} t$, is the fifth harmonic of the 19kHz pilot subcarrier with the condition that each time the 95kHz subcarrier crosses the time axis the 19kHz pilot subcarrier crosses the time axis simultaneously and in the same direction. The 95kHz subcarrier and its sidebands signal is the 95kHz subcarrier, vestigial sideband, suppressed carrier, amplitude modulated by the diagonal difference 4-channel input signal ¼[(LF+RB)−(RF+LB)]. The spectrum of the 95kHz subchannel exhibits a Nyquist characteristic about the subcarrier frequency which results in partial suppression of the upper sideband. The 95kHz subcarrier and its sidebands signal frequency modulates the main carrier to a maximum of 86.8 percent (excluding the SCA subchannel signal).

6. The 95kHz pilot subcarrier, $\sin\omega_{sv} t$, is the fifth harmonic of the 19kHz pilot subcarrier with the condition that each time the 95kHz pilot subcarrier crosses the time axis the 19kHz pilot subcarrier crosses the time axis simultaneously and in opposite direction. The 95kHz pilot subcarrier causes a 5 percent peak deviation of the main carrier. The 19kHz pilot subcarrier and the 95kHz pilot subcarrier combined cause a 13.2 percent peak deviation of the main carrier.

7. The SCA subchannel signal is a frequency modulated subcarrier at a nominal center frequency of 67kHz modulating the main carrier to a maximum of 10 percent. When the SCA subchannel signal is broadcast, the main channel, the first 38kHz subcarrier and its sidebands signal, the second 38kHz subcarrier and its sideband signal, the 95kHz subcarrier and its sidebands signal modulate the main carrier to a maximum of 76.8 percent.

8. The peak deviation of the main carrier resulting from simultaneous modulation by the main channel, the first 38kHz subcarrier and its sidebands signal, the second 38kHz subcarrier and its sidebands signal, the 95kHz subchannel, the 19kHz pilot subcarrier, the SCA subchannel signal, and the 95kHz pilot subcarrier is 100 percent of total modulation.

9. The pre-emphasis characteristics of all of the four channel stereo subcarrier channels are identical with those of the main channel (standard 75 microseconds).

10. The main channel and all quadraphonic subchannels are capable of accepting audio frequencies from 50 to 15,000Hz.

11.

a. When only equal positive left front and left back signals are applied, the main channel modulation causes an upward deviation of the main carrier frequency; also the first 38kHz subcarrier and its sidebands signal crosses the time axis simultaneously with the first 38kHz subcarrier and in the same direction.

b. When only equal positive left front and right front signals are applied, the main channel modulation causes an upward deviation of the main carrier frequency; also the second 38kHz subcarrier and its sidebands signal crosses the time axis simultaneously with the second 38kHz subcarrier and in the opposite direction.

c. When only equal positive left front and right back diagonal signals are applied, the main channel causes an upward deviation of the main carrier frequency; also the 95kHz subcarrier and its sidebands signal crosses the time axis simultaneously with the 95kHz subcarrier and in opposite direction.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. A quadraphonic receiver for developing four discrete audio signals from a transmitted composite quadraphonic baseband signal frequency-modulating an RF carrier, which composite baseband signal effectively includes in the frequency domain at least the following components;

a four-element sum component representing the sum of four input audio signals individually representative of first, second, third and fourth audio sources located, respectively, at the left-front, right-front, left-back and right-back of a listening point, a first difference component, representing a difference between pairs of adjacently disposed ones of said input audio signals, double sideband suppressed carrier amplitude modulating a first subcarrier of angular frequency $\omega_s$, a second difference component, representing a difference between different pairs of adjacently disposed ones of said input audio signals, double sideband suppressed carrier amplitude modulating a second subcarrier of angular frequency $\omega_s$ but displaced in phase, relative to the phase of said first subcarrier, by 90°, a diagonal difference component, representing a difference between diagonally disposed pairs of said input audio signals, lower single sideband suppressed carrier amplitude modulating a third subcarrier of angular frequency $\omega_{sv}$ and frequency spaced above the SCA subcarrier by an amount that is at least equal to the span occupied by one-half the bandwidth of the SCA channel plus the bandwidth of the lower sideband of said third subcarrier, and a pilot signal having an angular frequency $\omega_s/2$ and a phase which is such that the phase of the second harmonic thereof bears a predetermined relationship to said first subcarrier, said quadraphonic receiver comprising:

discriminator means for extracting said composite baseband signal from said RF carrier;

decoding means consisting of first, second and third demodulators, means for applying said extracted composite baseband signal to first input terminals of each of said demodulators, subcarrier regeneration means, responsive to said extracted composite baseband signal, for developing first, second and third local subcarriers corresponding in frequency and phase to those of said first, second and third modulated subcarriers, respectively, means for applying said first, second and third local subcarriers to second input terminals of respective ones of said first, second and third demodulators for effectively removing from said first, second and third modulated subcarriers, said first difference component, said second difference component and said diagonal difference component respectively, and a matrix network responsive to said extracted composite baseband signal and to said first and second difference components and said diagonal difference component for deriving four discrete output audio signals related to said four input audio signals.

2. A receiver of the type defined by claim 1 in which said subcarrier regeneration means includes means for developing said first, second and third local subcarriers from said pilot signal.

3. A receiver of the type defined by claim 1 which further includes de-emphasis circuits coupled to said matrix network for de-emphasizing said output signals derived by said matrix network.

4. A receiver of the type defined by claim 1 in which said diagonal difference component lower vestigial sideband suppressed carrier amplitude modulates said third subcarrier and said third demodulator includes means for demodulating said vestigial sideband modulated subchannel.

5. A receiver of the type defined by claim 1 in which said subcarrier regeneration means includes means for deriving a second pilot signal of angular frequency $\omega_{sv}$ for demodulating said third subcarrier.

6. A receiver of the type defined by claim 1 in which said first, second and third demodulators comprise product demodulators.

* * * * *